United States Patent [19]
Watson

[11] Patent Number: 5,360,997
[45] Date of Patent: Nov. 1, 1994

[54] AUTOMOBILE ANTI-THEFT SWITCH

[76] Inventor: Toy F. Watson, 113 Thomas Rd., Seaford, Va. 23696

[21] Appl. No.: 82,394

[22] Filed: Jun. 28, 1993

[51] Int. Cl.$^5$ .............................................. B60R 25/10
[52] U.S. Cl. ................................... 307/10.1; 340/426; 340/428; 307/10.2; 180/287
[58] Field of Search .................... 307/10.1, 10.2, 10.6, 307/9.1; 180/287; 340/426, 428, 407, 568; 116/33, 83, 87, 214; 109/20, 29, 31, 32

[56] References Cited

U.S. PATENT DOCUMENTS

| | | | |
|---|---|---|---|
| 4,300,495 | 11/1981 | Trevino et al. | 123/198 B |
| 4,438,426 | 3/1984 | Adkins | 340/64 |
| 4,762,198 | 8/1988 | Vagnone et al. | 180/287 |
| 4,958,142 | 9/1990 | Sayers | 340/426 |

FOREIGN PATENT DOCUMENTS

58-118435  1/1982  Japan .

*Primary Examiner*—A. D. Pellinen
*Assistant Examiner*—Aditya Krishnan

[57] ABSTRACT

A new and improved automobile anti-theft switch is installed in series with ignition circuitry for the automobile. The apparatus includes a relay assembly which includes a relay-controlled switch. The relay-controlled switch is in series with the ignition circuitry for the automobile. A relay driver assembly is connected to the relay assembly and controls the relay-controlled switch. A timer assembly is connected to the relay driver assembly and controls operation of the relay driver assembly and the relay assembly. A disguised first switch assembly is connected to the timer assembly. When the disguised first switch assembly is in the closed state, it controls initialization of the timer assembly. On the other hand, when the disguised first switch assembly is moved to the open state, it permits discharge of the timer assembly. The disguised first switch assembly is covered by an object in the automobile so that the disguised first switch assembly is not visible to a person sitting behind a steering wheel for driving the automobile. The automobile can run as long as the disguised first switch assembly is in a closed state and as long as the disguised first switch assembly is in an open state and the timer assembly is running. When a thief hijacks the automobile, the thief can leave the legitimate driver behind and drive away. Then, after the timer discharges, the automobile comes to a stop.

6 Claims, 5 Drawing Sheets

AUTOMOBILE ANTI-THEFT SWITCH

BACKGROUND OF THE INVENTION

1. Field of the Invention

The present invention relates generally to anti-theft devices for automobiles, and more particularly, to an apparatus for preventing theft of the automobile by opening tile ignition circuit.

2. Description of the Prior Art

Automobile theft is a common crime, and many innovations have been developed to counter auto theft. In this respect, there are a number of situations in which auto theft commonly take place. In one situation, the automobile is unattended. In this case, the thief breaks into the automobile, shunts the ignition switch, and drives away. In another situation, while the legitimate driver is present, the thief hijacks the automobile. In this case, the keys are already in the ignition, and the thief does not need to perform any actions on the electrical circuitry of the automobile.

The following U.S. patents disclose a number of such anti-theft innovations: U.S. Pat. Nos. 3,824,403; 4,762,198; 4,792,792; 4,958,142; and 5,061,915.

More specifically, U.S. Pat. No. 3,824,403 discloses a power control circuit which operates to enable the start-up of a vehicle engine in response to a predetermined sequence of events such as depressing the brake pedal and actuating the ignition switch within a predetermined period of time. This device does not appear to have a provision for stopping an automobile engine once it has been started; that is, this device will not thwart a car hijacking or "carjacking". In this respect, it would be desirable if an anti-theft device for an automobile were provided which help prevent an automobile hijacking.

Another problem associated with the device in U.S. Pat. No. 3,824,403 is the requirement that a specific sequence of events take place in order for the automobile to be started. In certain situations, such a device may prove to cause great inconvenience. For example, when a person leaves the automobile with a parking attendant at a parking garage, the parking attendant will not know how to restart the automobile when the patron returns. In this respect, it would be desirable if an anti-theft device for an automobile were provided which did not depend upon a sequence of events in order for the automobile to be started.

U.S. Pat. No. 4,762,198 discloses a vehicle anti-theft system that employs an auxiliary switch that is interposed in the ignition controlling circuit between the main key switch and the ignition starting unit. The auxiliary switch is formed with a normally open single pole switch. The switch is provided with a separate probe which is insertable in the entrance tube of the switch structure to close the switch contacts. The switch is hidden within a decorative feature of a wall in the vehicle. A number of problems are associated with this type of device. For one thing, the separate probe may be lost or forgotten. If so, the automobile would be inoperable. In addition, such a device could not thwart an automobile hijacking. If a hijacker commandeers the automobile, the legitimate automobile operator would be at high risk if the operator disabled the automobile in the presence of the hijacker. In this respect, it would be desirable if an anti-theft device for an automobile were provided which thwarted a successful automobile hijacking without subjecting the legitimate operator to a high risk situation in which the automobile became disabled when both the hijacker and the legitimate operator were both present at the automobile at the same time.

U.S. Pat. No. 4,792,792 discloses an anti-theft system for an automobile in which a relay and two single-pole-single-throw switches are arranged in a manner such that, with attempted theft, the engine is deactivated, the horn sounds, and the headlights are turned on. A problem associated with this system is that two switches must be actuated. Such a system would not readily be usable when a parking attendant takes over control of the automobile at a parking garage. Moreover, if a long length of time elapses before the such an automobile is abandoned by a thief and recovered by the legitimate operator, the automobile battery may run down due to being drained by the headlights and horn. In this respect, it would be desirable if an anti-theft device for an automobile were provided which did not drain the automobile battery with headlight and horn usage when the automobile is abandoned by a thief.

U.S. Pat. No. 4,958,142 discloses an automobile theft deterrent system which employs two alarm systems. When a first alarm system operates, the second alarm system, under timer control, follows by spraying a would be thief with a pressurized, non-toxic, and non-corrosive irritant. In addition a siren or loudspeaker is also actuated by the second alarm system. This is a complex anti-theft system requiring two alarm systems. Moreover, if a thief is in any way harmed by being exposed to an irritant, in this litigious society, even a thief may bring a civil suit for damages against the owner of the automobile. In this respect, it would be desirable if an anti-theft device for an automobile were provided which did not employ any chemical irritants to be applied to a would be thief.

U.S. Pat. No. 5,061,915 discloses an anti-theft system for an automobile which includes a complex arrangement of interrelated relays and switches. The system is so complex that it is designed so that an operator can practice a sequence of disarming steps before actually using the invention in its intended way. In this respect, it would be desirable if an anti-theft device for an automobile were provided which is simple in operation and does need carrying out a complex series of arming or disarming steps.

Additional features would be desired in an anti-theft device for an automobile. A switch for enabling or disabling the automobile's ignition system should be easy to operate with a person's finger or fingers. The switch for enabling or disabling the automobile's ignition system may be concealed from immediate view by a driver as the driver is seated behind the steering wheel. By being concealed, it would be very difficult for a thief to locate it.

If an automobile is hijacked, the legitimate driver should be able to surreptitiously actuate the anti-theft device without letting the thief be aware of the actuation.

The desired automobile anti-theft device should enable a hijacker to be able to take over the automobile and drive away for a limited period of time, at which the automobile engine is disabled and the automobile ceases to operate. More specifically, the automobile should be enabled for a predetermined period of time after actuation of the hidden disabling device. This mode of operation will deter the thief from attacking the legitimate driver. Such danger to the legitimate driver would have a greater tendency to occur if the thief receives resistance from the legitimate driver or if an alarm sounds while the thief is in the presence of the legitimate driver as an alarm is sounded or as the automobile is disabled.

To make it even more difficult for a thief to successfully carry out an automobile hijacking, it may be desirable to provide a second hidden switch that is required to be actuated in order for the automobile ignition system to be enabled. If the second hidden switch is not actuated, then the automobile will not operate after the predetermined delay time period expires.

The time delay until disablement of the automobile should be an adjustable feature of an automobile anti-theft switch. Some persons may fear that if the time delay is too short, the automobile will become disabled while the thief is uncomfortably close to the legitimate driver. Another person may be more concerned that the thief not be able to drive the automobile too far before it becomes disabled. Such choices should be in the control of the user of the device.

Thus, while the foregoing body of prior art indicates it to be well known to use automobile anti-theft devices, the prior art described above does not teach or suggest an automobile anti-theft switch which has the following combination of desirable features: (1) helps prevent a successful automobile hijacking; (2) does not depend upon a special, unconventional sequence of events in order for the automobile to be started; (3) thwarts a successful automobile hijacking without subjecting the legitimate operator to a high risk situation in which the automobile becomes disabled when both the hijacker and the legitimate operator are present at the automobile at the same time; (4) does not drain the automobile battery with headlight and horn usage when the automobile is abandoned by a thief; (5) does not employ any chemical irritants to be applied to a would be thief; (6) is simple in operation and does need carrying out a complex series of arming or disarming steps; (7) is easy to operate with a person's finger or fingers; (8) is concealed from immediate view by a driver as the driver is seated behind the steering wheel; (9) can be actuated surreptitiously by the legitimate driver without letting the thief be aware of the actuation; (10) enables a hijacker to take over the automobile and drive away for a limited period of time, after which the automobile engine is disabled and the automobile ceases to operate; (11) provides a second hidden switch that is required to be actuated in order for the automobile ignition system to be enabled; and (12) has an adjustable time delay until disablement of the automobile takes place. The foregoing desired characteristics are provided by the unique automobile anti-theft switch of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved automobile anti-theft switch which is installed in series with ignition circuitry for the automobile. The apparatus includes a relay assembly which includes a coil and a relay-controlled switch. The relay-controlled switch is in series with the ignition circuitry for the automobile. The relay-controlled switch includes a closed switch state and an open switch state. A relay driver assembly is connected to the relay coil and controls whether the relay-controlled switch is in the closed switch state or the open switch state. A timer assembly is connected to the relay driver assembly and controls operation of the relay driver assembly and the relay assembly. A disguised first switch assembly includes a closed switch state and an open switch state. The disguised first switch assembly is connected to the timer assembly. When the disguised first switch assembly is in the closed state, it controls initialization of the timer assembly. On the other hand, when the disguised first switch assembly is moved to the open state, it permits discharge of the timer assembly.

The disguised first switch assembly is covered by an object in the automobile so that the disguised first switch assembly is not visible to a person sitting behind a steering wheel for driving the automobile. The first switch assembly, the relay assembly, the relay driver assembly, and the timer assembly are housed in a common housing.

The relay driver assembly includes a transistor, a bias resistor, and a load resistor. The timer assembly includes an adjustable means for adjusting a timing interval timed by the timer assembly. The timer assembly includes a charged capacitor and a bleeder resistor controlling a rate of discharge of the capacitor. The bleeder resistor is an adjustable, variable resistor. Alternatively, the timer assembly can be adjusted using an adjustable variable capacitor. The housing includes an adjustment aperture through which an adjusting tool can be inserted to adjust the adjustable bleeder resistor in the timer assembly. A single variable resistor serves dual functions of the load resistor in the relay driver assembly and the bleeder resistor in the timer assembly.

A disguised second switch assembly includes a closed state and an open state. The disguised second switch assembly is connected in series with the disguised first switch assembly, such that when both the disguised second switch assembly and the disguised first switch assembly are in their respective closed states, the relay assembly is actuated, and such that when either the disguised second switch assembly or the disguised first switch assembly is in a respective open state, the relay assembly is deactuated.

The disguised second switch assembly is in the form of a floor mat assembly. The floor mat assembly includes a flexible, resilient, non-conductive housing, a first conductive surface attached to a first inner surface of the flexible, resilient non-conductive housing, a second conductive surface attached to a second inner surface of the flexible, resilient non-conductive housing, and respective conductors and connecting the respective first conductive surface and the second conductive surface to the disguised first switch assembly.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved automobile anti-theft switch which has all of the advantages of the prior art and none of the disadvantages.

It is another object of the present invention to provide a new and improved automobile anti-theft switch which may be easily and efficiently manufactured and marketed.

It is a further object of the present invention to provide a new and improved automobile anti-theft switch which is of durable and reliable construction.

An even further object of the present invention is to provide a new and improved automobile anti-theft switch which is susceptible of a low cost of manufacture with regard to both materials and labor, and which accordingly is then susceptible of low prices of sale to the consuming public, thereby making such automobile anti-theft switch available to the buying public.

Still yet a further object of the present invention is to provide a new and improved automobile anti-theft switch which helps prevent a successful automobile hijacking.

Still another object of the present invention is to provide a new and improved automobile anti-theft switch that does not depend upon a special, unconventional sequence of events in order for the automobile to be started.

Yet another object of the present invention is to provide a new and improved automobile anti-theft switch which thwarts a successful automobile hijacking without subjecting the legitimate operator to a high risk situation in which the automobile becomes disabled when both the hijacker and the legitimate operator are present at the automobile at the same time.

Even another object of the present invention is to provide a new and improved automobile anti-theft switch that does not drain the automobile battery with headlight and horn usage when the automobile is abandoned by a thief.

Still a further object of the present invention is to provide a new and improved automobile anti-theft switch which does not employ any chemical irritants to be applied to a would be thief.

Yet another object of the present invention is to provide a new and improved automobile anti-theft switch that is simple in operation and does need carrying out a complex series of arming or disarming steps.

Still another object of the present invention is to provide a new and improved automobile anti-theft switch which is easy to operate with a person's finger or fingers.

Yet another object of the present invention is to provide a new and improved automobile anti-theft switch that is concealed from immediate view by a driver as the driver is seated behind the steering wheel.

Still a further object of the present invention is to provide a new and improved automobile anti-theft switch that can be actuated surreptitiously by the legitimate driver without letting the thief be aware of the actuation.

Yet another object of the present invention is to provide a new and improved automobile anti-theft switch which enables a hijacker to take over the automobile and drive away for a limited period of time, after which the automobile engine is disabled and the automobile ceases to operate.

Still a further object of the present invention is to provide a new and improved automobile anti-theft switch that provides a second hidden switch that is required to be actuated in order for the automobile ignition system to be enabled.

Yet another object of the present invention is to provide a new and improved automobile anti-theft switch which has an adjustable time delay until disablement of the automobile takes place.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved automobile anti-theft switch embodying the principles and concepts of the present invention will be described.

Turning initially to FIGS. 1–4, there is shown a first exemplary embodiment of the automobile anti-theft switch of the invention generally designated by reference numeral 10 that is installed in series with ignition circuitry for the automobile. In its preferred form, automobile anti-theft switch 10 includes a relay assembly 14 which includes a coil 16 and a relay-controlled switch 18. The relay-controlled switch 18 is in series with the ignition circuitry for the automobile. The ignition circuitry is represented by conductors 13 and 15. The automobile battery 17 powers all the circuitry of the invention. The relay-controlled switch 18 includes a closed switch state and an open switch state. A relay driver assembly is connected to the relay coil 16 and controls whether the relay-controlled switch 18 is in the closed switch state or the open switch state. A timer assembly is connected to the relay driver assembly and controls operation of the relay driver assembly and the relay assembly 14. A disguised first switch assembly 12 includes a closed switch state and an open switch state. The disguised first switch assembly 12 is connected to the timer assembly. When the disguised first switch assembly 12 is in the closed state, it controls initialization of the timer assembly. On the other hand, when the disguised first switch assembly 12 is moved to the open state, it permits discharge of the timer assembly.

The disguised first switch assembly 12 is covered by an object 21 in the automobile so that the disguised first switch assembly 12 is not visible to a person sitting behind a steering wheel 25 for driving the automobile. Alternatively, the disguised first switch assembly 12 can have a visible switch which is mislabelled so as to deceive an unknowing person as to its real function. The first switch assembly 12, the relay assembly 14, the relay driver assembly, and the timer assembly are housed in a common housing 28.

Figure 1:
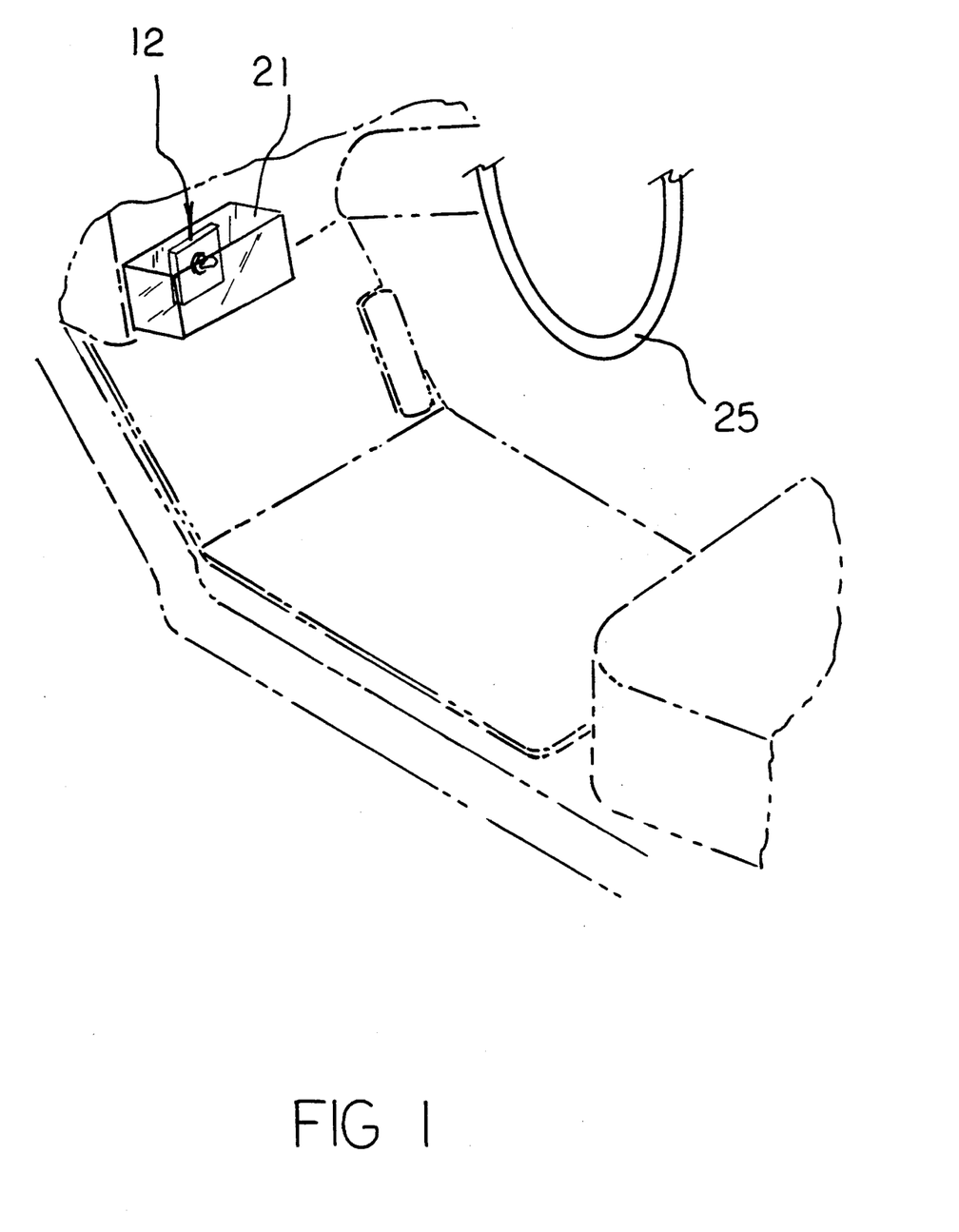
FIG. 1 is a perspective view showing a first preferred embodiment of the automobile anti-theft switch of the invention installed in a concealed location near the steering wheel.
Figure 2:
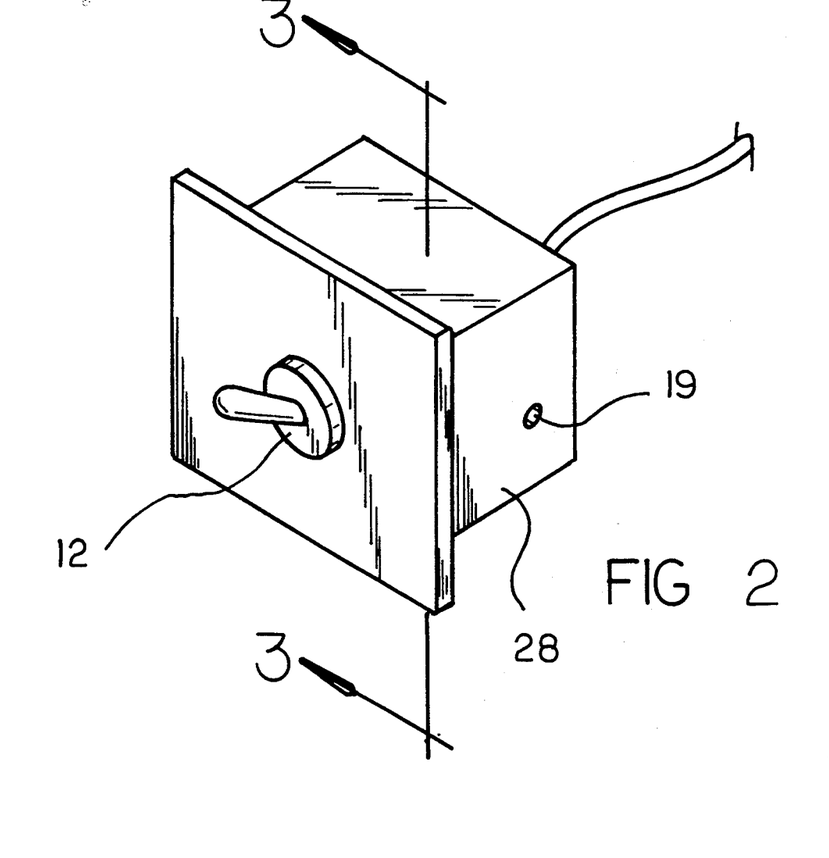
FIG. 2 is an enlarged perspective view of the switch-/circuitry assembly used with the embodiment of the invention shown in FIG. 1; an access port for adjusting the time delay is shown.
Figure 3:
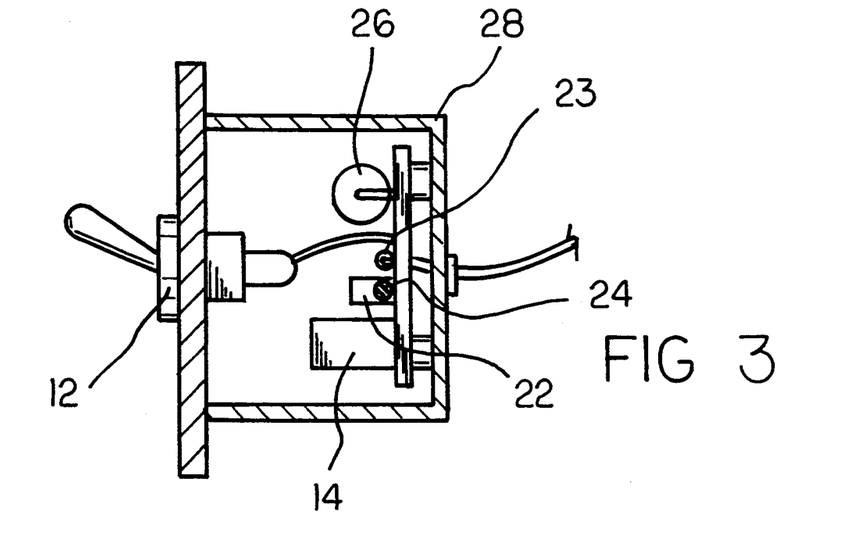
FIG. 3 is a cross-sectional view of the switch/circuitry assembly shown in FIG. 2 taken along line 3—3 thereof.
Figure 4:
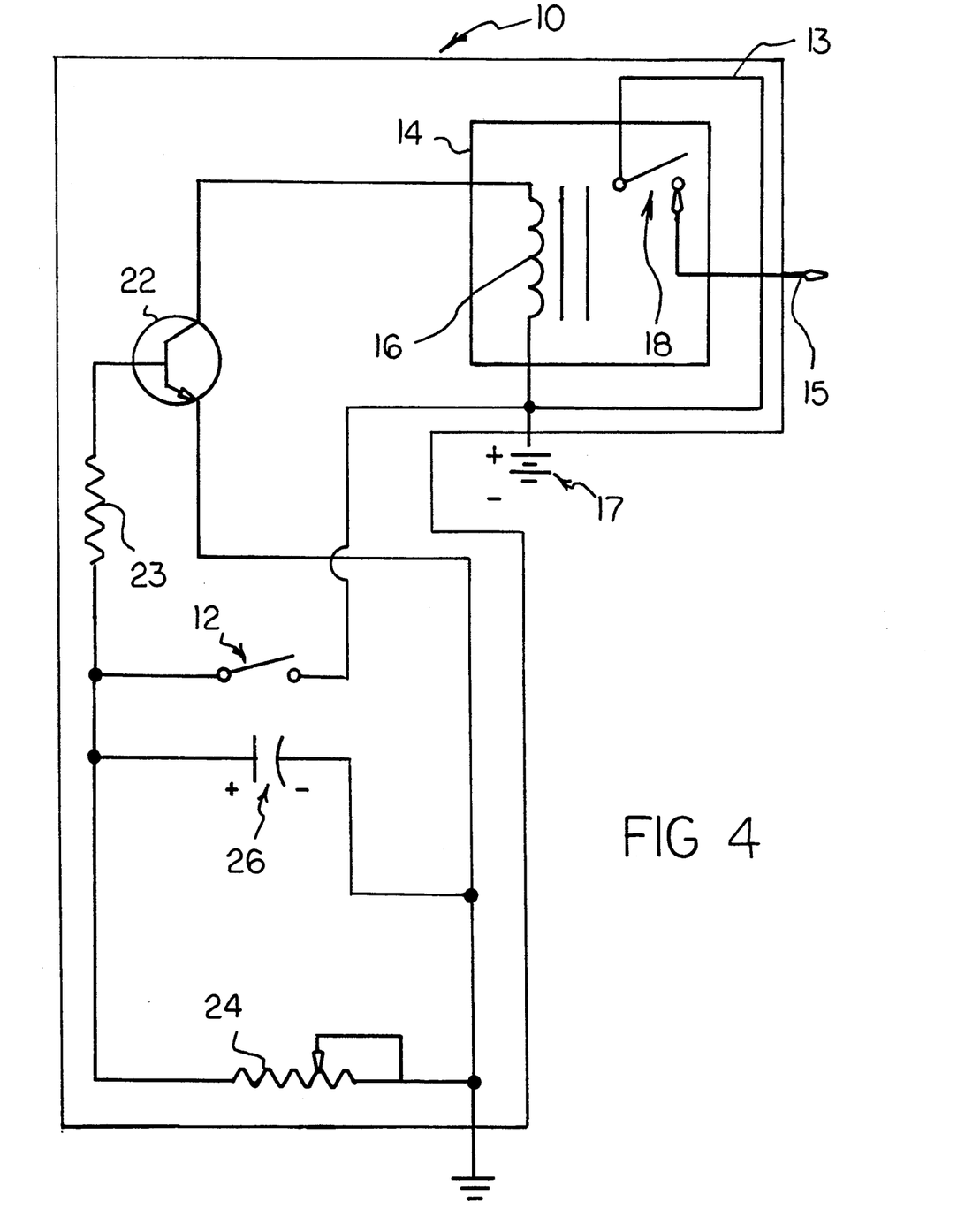
FIG. 4 is an electrical schematic diagram of the switch/circuit assembly used in the embodiment of the automobile anti-theft switch of the invention shown in FIG. 1.

The relay driver assembly includes a transistor 22, a bias resistor 23, and a load resistor 24. The timer assembly includes an adjustable means for adjusting a timing interval timed by the timer assembly. The timer assembly includes a charged capacitor 26 and a bleeder resistor controlling a rate of discharge of the capacitor 26. The bleeder resistor is an adjustable, variable resistor. Alternatively, the timer assembly can be adjusted using an adjustable variable capacitor. The housing 28 includes an adjustment aperture 19 through which an adjusting tool such as a screwdriver can be inserted to adjust the adjustable bleeder resistor in the timer assembly. By adjusting the bleeder resistor, the predetermined time that the timer assembly runs before the relay assembly 14 is deactuated can be adjusted. A single variable resistor 24 serves dual functions of the load resistor in the relay driver assembly and the bleeder resistor in the timer assembly.

In operation, with reference to FIG. 4, when the disguised first switch assembly 12 is switched to the open state, the capacitor 26 of the timer assembly begins to discharge. The transistor 22 remains actuated, and the relay assembly 14 remains actuated with the relay-controlled switch 18 in a closed state for a predetermined period of time. Only after the capacitor 26 discharges to a minimal charge state, then the transistor is turned off, and the relay assembly 14 becomes deactuated. Then the relay-controlled switch 18 moves to the open state shown in FIG. 4. With the relay-controlled switch 18 in the open state, the automobile engine is disabled because the ignition circuit is open. The rate of discharge of the capacitor 26, and therefore the length of time that the timer assembly keeps the relay-controlled switch 18 in the closed state, depends upon the capacity of the capacitor 26 and the resistance of the adjustable-resistance bleeder resistor 24.

Selection of the disguised first switch assembly 12, the transistor 22, the bias resistor 23, the combined load and bleeder resistor 24, the capacitor 26, and the relay assembly 14 can be made using principles that are well known to an ordinary practitioner.

In using the automobile anti-theft switch of the invention, when a legitimate driver contemplates that the automobile is going to be hijacked, surreptitiously the legitimate driver will move the disguised first switch assembly 12 from the closed state to the open state. When this occurs, the timer assembly begins to run. The timer assembly continues to run after the legitimate driver leaves the automobile, and the thief drives away. Then, when the timer assembly finally completes it predetermined run of time due to sufficient discharge of the capacitor 26, the transistor 22 is turned off, the relay assembly 14 is deactuated, the relay-controlled switch 18 moves to the open state, the ignition circuit is opened, and the automobile ceases to run. It is clear that the automobile comes to a stop after the thief has driven the automobile away from the legitimate driver.

Another beneficial feature of the automobile anti-theft switch 10 of the invention is that it prevents a thief from stealing an automobile whether or not the keys are left in the ignition switch.

Figure 5:
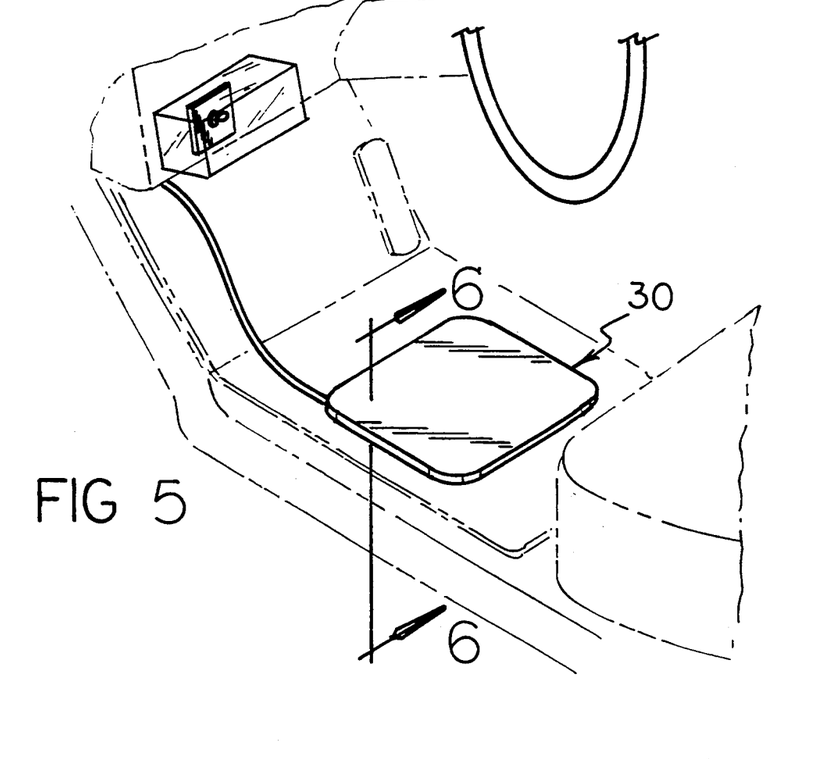
FIG. 5 is a perspective view of a second preferred embodiment of the automobile anti-theft switch of the invention employing a second concealed switch.
Figure 6:
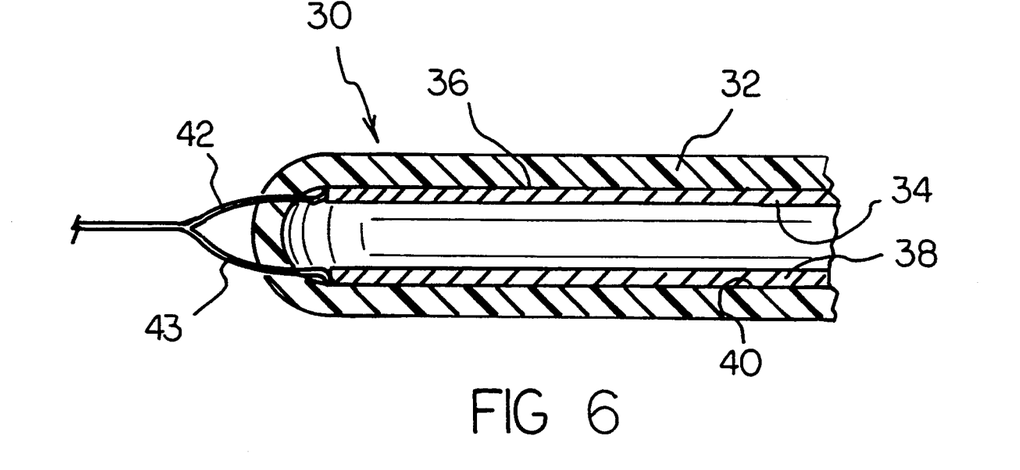
FIG. 6 in an enlarged, partial cross-sectional view of the second concealed switch shown in FIG. 5 taken along the line 6—6 of FIG. 5.
Figure 7:
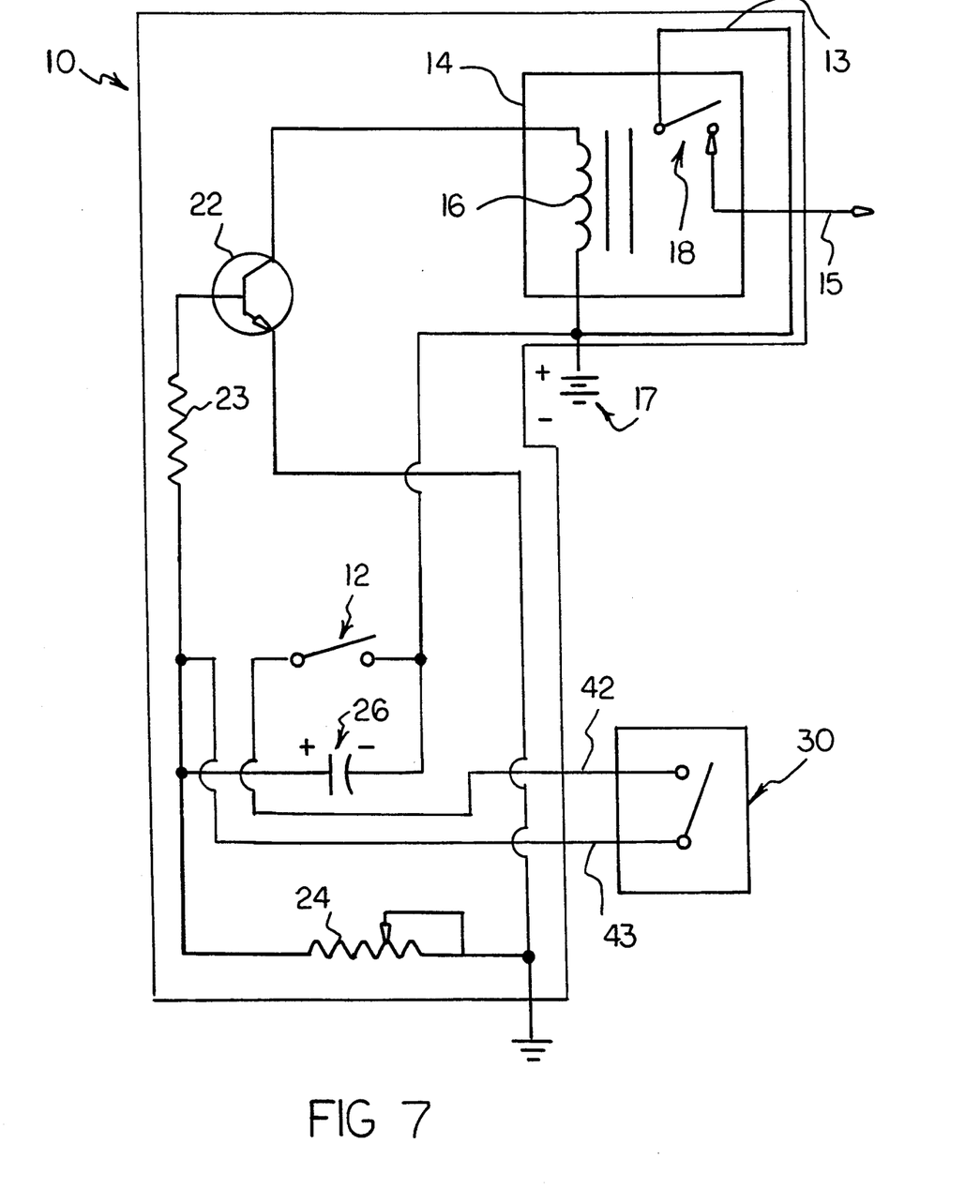
FIG. 7 is an electrical schematic diagram of the switch/circuit assembly used in the embodiment of the automobile anti-theft switch of the invention shown in FIG. 5.

Turning to FIGS. 5–7, a second embodiment of the invention is shown. Reference numerals are shown that correspond to like reference numerals that designate like elements shown in the other figures. In addition, a disguised second switch assembly 30 which includes a closed state and an open state. The disguised second switch assembly 30 is connected in series with the disguised first switch assembly 12, such that when both the disguised second switch assembly 30 and the disguised first switch assembly 12 are in their respective closed states, the relay assembly 14 is actuated, and such that when either the disguised second switch assembly 30 or the disguised first switch assembly 12 is in a respective open state, the relay assembly 14 is deactuated.

The disguised second switch assembly 30 is in the form of a floor mat assembly 30. The floor mat assembly includes a flexible, resilient, non-conductive housing 32, a first conductive surface 34 attached to a first inner surface 36 of the flexible, resilient non-conductive housing 32, a second conductive surface 38 attached to a second inner surface 40 of the flexible, resilient non-conductive housing 32, and respective conductors 42 and 43 connecting the respective first conductive surface 34 and the second conductive surface 38 to the disguised first switch assembly 12.

Thus, the operation of the embodiment shown in FIG. 7 is similar to the operation of the embodiment shown in FIG. 4 with the additional properties that when both the disguised second switch assembly 30 and the disguised first switch assembly 12 are in the closed state, the capacitor 26 is fully charged, the transistor 22 is on, the relay assembly 14 is actuated, the relay-controlled switch 18 is closed, the ignition circuit is closed, and the automobile can operate. On the other hand, when either the disguised second switch assembly 30 or the disguised first switch assembly 12 is moved to the open state, the timer assembly begins to run, and the capacitor 26 begins to discharge. Finally, when the capacitor 26 reaches its minimum state of charge, the transistor 22 turns off, the relay assembly 14 is deactuated, the relay-controlled switch 18 moves to the open state, the ignition circuit is opened, and the automobile ceases to run.

Another variation of the invention would have the electric door locks of the automobile controlled by the invention. In this way, a thief would be imprisoned inside the automobile, and this would make it a lot easier to apprehend the thief.

The disguised first switch assembly could be concealed in any number of places to be selected by the automobile owner. New automobile manufacturers could wire it in and leave the disguised first switch assembly with enough wire to locate it appropriately at the time of purchase. The apparatus of the invention can readily be installed in an automobile by any person reasonably competent with a screwdriver. Alternatively, the disguised first switch assembly of the invention can be visible to the driver, but the switch can be mislabelled so as to provide misinformation to the driver. For example, the disguised first switch assembly can be labelled erroneously as a trunk release or gas cap release. If the relay-operated ignition switch is wired into the power supply to the ignition switch, then the engine and all accessories powered through that circuit will be disabled when the relay is actuated. Alternatively, if the relay-controlled ignition switch is wired into the circuit to the ignition coil after the ignition switch, then only the engine will be disabled.

The components of the automobile anti-theft switch of the invention can be made from inexpensive and durable readily available electronic components.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved automobile anti-theft switch that is low in cost, relatively simple in design and operation, and which may advantageously be used to help prevent a successful automobile hijacking. With the invention, an automobile anti-theft switch is provided which does not depend upon a special, unconventional sequence of events in order for the automobile to be started. With the invention, an automobile anti-theft switch is provided which thwarts a successful automobile hijacking without subjecting the legitimate operator to a high risk situation in which the automobile becomes disabled when both the hijacker and the legitimate operator are present at the automobile at the same time. With the invention, an automobile anti-theft switch is provided which does not drain the automobile battery with headlight and horn usage when the automobile is abandoned by a thief. With the invention, an automobile anti-theft switch is provided which does not employ any chemical irritants to be applied to a would be thief. With the invention, an automobile anti-theft switch is provided which is simple in operation and does need carrying out a complex series of arming or disarming steps. With the invention, an automobile anti-theft switch is provided which is easy to operate with a person's finger or fingers. With the invention, an automobile anti-theft switch is provided which is concealed from immediate view by a driver as the driver is seated behind the steering wheel. With the invention, an automobile anti-theft switch is provided which can be actuated surreptitiously by the legitimate driver without letting the thief be aware of the actuation. With the invention, an automobile anti-theft switch is provided which enables a hijacker to take over the automobile and drive away for a limited period of time, after which the automobile engine is disabled and the automobile ceases to operate. With the invention, an automobile anti-theft switch is provided which provides a second hidden switch that is required to be actuated in order for the automobile ignition system to be enabled. With the invention, an automobile anti-theft switch is provided which has an adjustable time delay before disablement of the automobile takes place.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved automobile anti-theft switch apparatus installed in series with ignition circuitry for the automobile, said apparatus comprising:

a relay assembly which includes a coil and a relay-controlled switch, said relay-controlled switch being in series with the ignition circuitry for the automobile, said relay-controlled switch including a closed switch state and an open switch state, a relay driver assembly, connected to said relay coil, for controlling whether said relay-controlled switch is in the closed switch state or the open switch state, a timer assembly, connected to said relay driver assembly, for controlling operation of said relay driver assembly and said relay assembly, wherein said timer assembly maintains said relay-controlled switch in a closed switch state for a predetermined period of time permitting automobile operation for a predetermined of time, and a disguised first switch assembly including a closed switch state and an open switch state, said disguised first switch assembly connected to said timer assembly for controlling initialization of said timer assembly and permitting discharge of said timer assembly.

2. The apparatus described in claim 1 wherein said disguised first switch assembly is covered by an object in the automobile so that said disguised first switch assembly is not visible to a person sitting behind a steering wheel for driving the automobile.

3. The apparatus described in claim 1 wherein said first switch assembly, said relay assembly, said relay driver assembly, and said timer assembly are housed in a common housing.

4. The apparatus described in claim 1 wherein said relay driver assembly includes a transistor, a bias resistor, and a load resistor.

5. The apparatus described in claim 1 wherein said timer assembly includes means for adjusting a timing interval timed by said timer assembly, wherein said timer assembly includes a charged capacitor and a bleeder resistor controlling a rate of discharge of said capacitor, wherein said bleeder resistor is an adjustable, variable resistor, wherein said relay driver assembly includes a transistor, a bias resistor, and a load resistor, and wherein a single variable resistor serves dual functions of said load resistor in said relay driver assembly and said bleeder resistor in said timer assembly.

6. The apparatus described in claim 1 wherein:
said disguised first switch assembly, said relay assembly, said relay driver assembly, and said timer assembly are housed in a common housing,
said timer assembly includes a charged capacitor and a bleeder resistor controlling a rate of discharge of said capacitor,
said housing includes an adjustment aperture through which an adjusting tool can be inserted to adjust said adjustable bleeder resistor in said timer assembly.

* * * * *